United States Patent [19]

Kakui

[11] 4,125,347
[45] Nov. 14, 1978

[54] ROTARY PISTON ENGINE HAVING REINFORCED SIDE HOUSINGS

[75] Inventor: Kuniaki Kakui, Hiroshima, Japan

[73] Assignee: Toyo Kogyo Co., Ltd., Hiroshima, Japan

[21] Appl. No.: 794,108

[22] Filed: May 5, 1977

[30] Foreign Application Priority Data

May 6, 1976 [JP] Japan .............................. 51-57111[U]

[51] Int. Cl.² ............................................. F04C 29/04
[52] U.S. Cl. ...................................... 418/83; 418/149
[58] Field of Search .................... 418/60, 61 A, 83, 84, 418/149; 123/8.01

[56] References Cited

U.S. PATENT DOCUMENTS 3,280,802  10/1966  Froede .................................. 123/8.01
3,861,837  1/1975  Flynn, Jr. et al. ................... 123/8.01

OTHER PUBLICATIONS

Norbye, J. P., *The Wankel Engine*, Chilton Book Company, Philadelphia, 1971, P. 270.

*Primary Examiner*—Carlton R. Croyle
*Assistant Examiner*—Leonard E. Smith
*Attorney, Agent, or Firm*—Fleit & Jacobson

[57] ABSTRACT

Rotary piston engine comprises a casing which includes a rotor housing and a pair of side housings secured to the opposite sides of the rotor housing. The housings are formed with water jackets which are mutually communicating to provide circulation of cooling liquid. The side housing is formed with reinforcement ribs so as to prevent deformation of the inner wall of the side housing.

11 Claims, 9 Drawing Figures

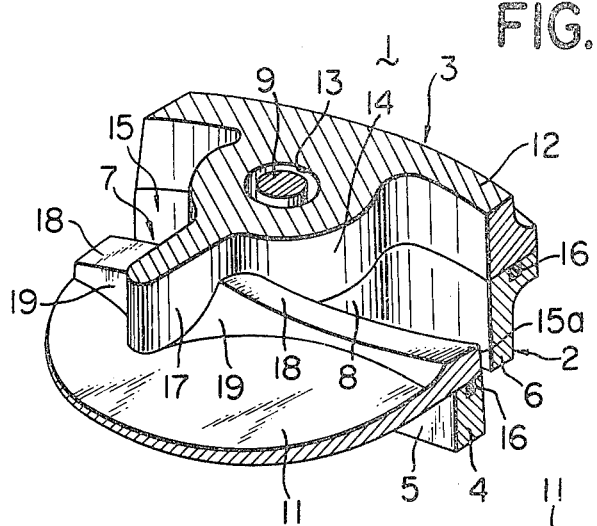
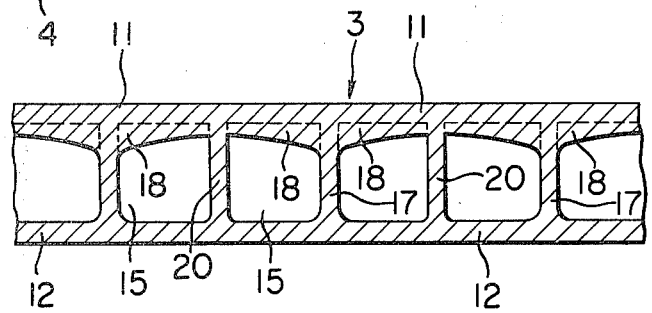
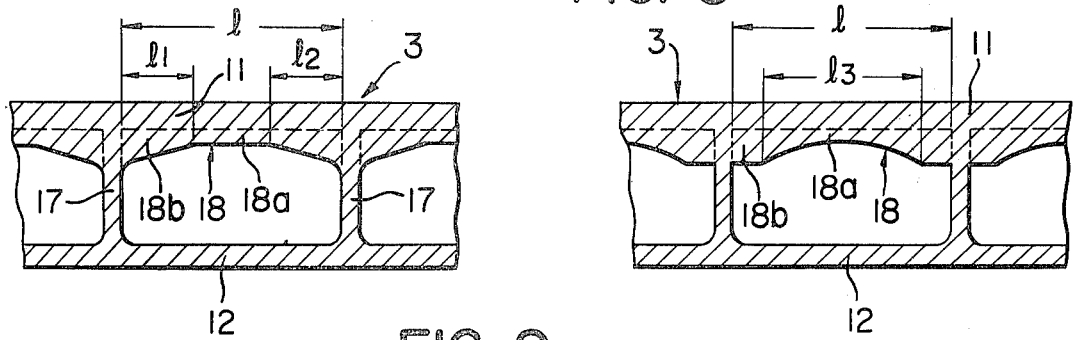
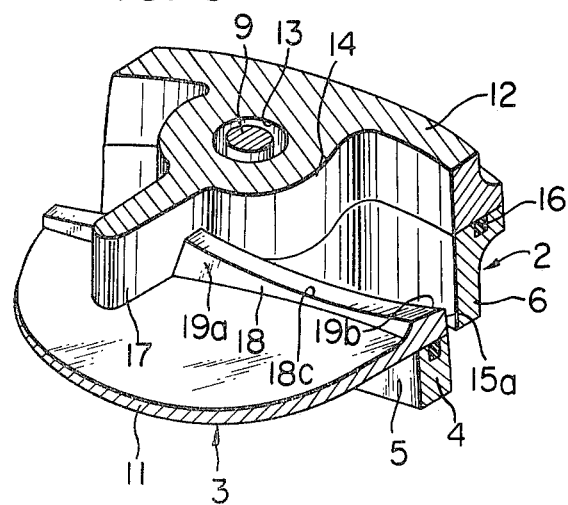

ROTARY PISTON ENGINE HAVING REINFORCED SIDE HOUSINGS

The present invention relates to rotary piston engines and more particularly to side housings for such rotary piston engines.

Conventional rotary piston engines include a casing which comprises a rotor housing having an inner wall of trochoidal configuration and a pair of side housings secured to the opposite sides of the rotor housing to define a rotor cavity in the casing, and a substantially polygonal rotor disposed in said cavity for rotation with apex portions in sliding contact with the inner wall of the rotor housing.

It is also conventional that, in order to provide circulation of cooling liquid, the housings are formed with water jackets. Since side housings are secured to the rotor housing by a plurality of tightening bolts extending through the housings at circumferentially spaced positions, the water jackets in the rotor housing are circumferentially spaced with a bulged intermediate wall between each two adjacent water jackets and the side housings are also formed with bosses which are adapted to align and co-operate with the intermediate walls in the rotor housing, so that the bolts can be inserted through the aligned bosses and the intermediate walls. The spacings of such tightening bolts may be determined so that the side housings are secured to the rotor housing with a uniform contact pressure throughout their peripheral length so as to ensure gas tightness at the interface between the rotor housing and the side housings. However, it has been experienced that the contact pressure between each side surface of the rotor housing and the inner wall of the corresponding side housing varies along the circumferential direction of the housings. In fact, there is a substantial difference in such contact pressure between the position where the tightening bolt is located and the intermediate portion between two adjacent bolts. Further, there is a tendency that the side housing is deflected under the influence of the combustion gas pressure particularly at such intermediate portion between each two adjacent bolts.

It has therefore been common practice to provide gas seals between the side surfaces of the rotor housing and the inner walls of the side housings. However, such gas seals alone have not been effective to prevent leakage of gas due to the aforementioned deflection of the side housings and further such seals are often deteriorated upon contact with the engine combustion gas.

Accordingly, it is an object of the present invention to provide rotary piston engines having means for preventing leakage of gas at the interface between the rotor housing and the side housings secured to the opposite sides of the rotor housing.

Another object of the present invention is to provide rotary piston engines having side housings which are rigid enough to resist any deflection under the engine combustion gas pressure.

A further object of the present invention is to provide side housings for rotary piston engines which are provided with stiffening means for preventing deflection under the engine combustion gas pressure.

According to the present invention, the above and other objects can be accomplished by a rotary piston engine including a casing which comprises a rotor housing having an inner wall of trochoidal configuration and opposite side surface and a pair of side housings including inner walls and secured to the opposite sides of the rotor housing with inner wall surfaces of the inner walls in contact with the side surfaces of the rotor housing, a substantially polygonal rotor disposed in said casing with apex portions in sliding contact with the inner wall of the rotor housing, said rotor housing being formed with a plurality of axially extending water jackets which are separated each other by a plurality of circumferentially spaced intermediate walls, each of said side housings being formed with water jacket means having a plurality of openings which are aligned with said water jackets in the rotor housing and separated by a plurality of bosses adapted to be aligned with the intermediate walls in the rotor housing, said rotor and side housings being connected together by a plurality of tightening bolts extending through the aligned bosses and intermediate walls, said side housing being provided on said inner wall with means extending between said bosses substantially along peripheries of said openings for reinforcing it against deflection under pressure of combustion gas.

According to a preferable aspect of the present invention, said reinforcing means includes ribs or ridges having a height which is smaller at the intermediate portions than at the end portions. Further, it is preferable that such ribs or ridges be provided only in the hot zone which may be defined as an area extending as seen in the direction of rotor rotation from the position of the trailing apex portion at the compression dead center to the point of the minor axis of the trochoid at the side where the exhaust and intake ports are positioned.

The invention will be more clearly understood from the following descriptions of preferred embodiments taking reference to the accompanying drawings, in which:

FIG. 5 is a perspective view similar to FIG. 4 but showing another embodiment of the present invention;

FIG. 6 is a sectional view similar to FIG. 3 but showing a further embodiment of the present invention;

Figure 3:
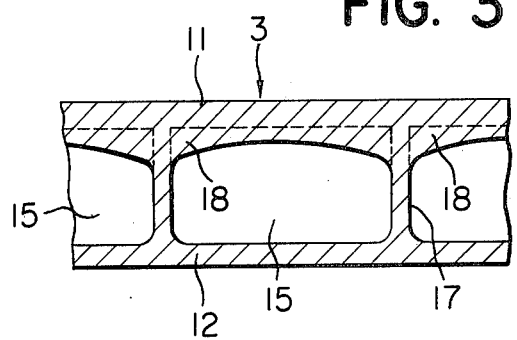
FIG. 3 is a sectional view taken substantially along the line III—III in FIG. 2.
Figure 4:
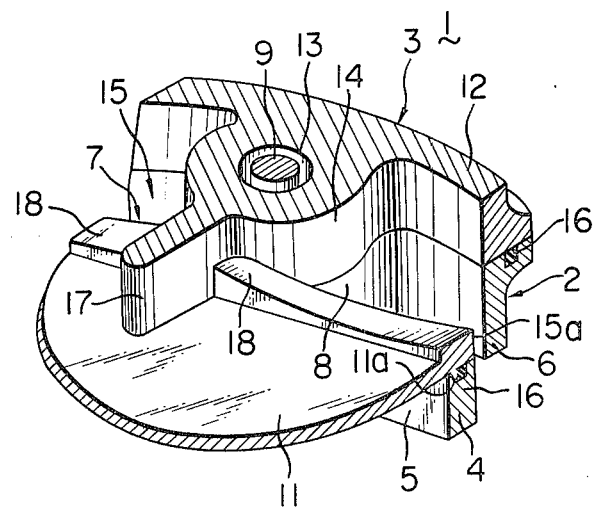
FIG. 4 is a fragmentary perspective view showing the reinforcement rib in accordance with one embodiment of the present invention.

FIGS. 7 and 8 are sectional views similar to FIGS. 3 and 6 but showing further embodiments of the present invention; and FIG. 9 is a perspective view similar to FIGS. 4 and 5 but showing a further embodiment of the present invention.

Figure 1:
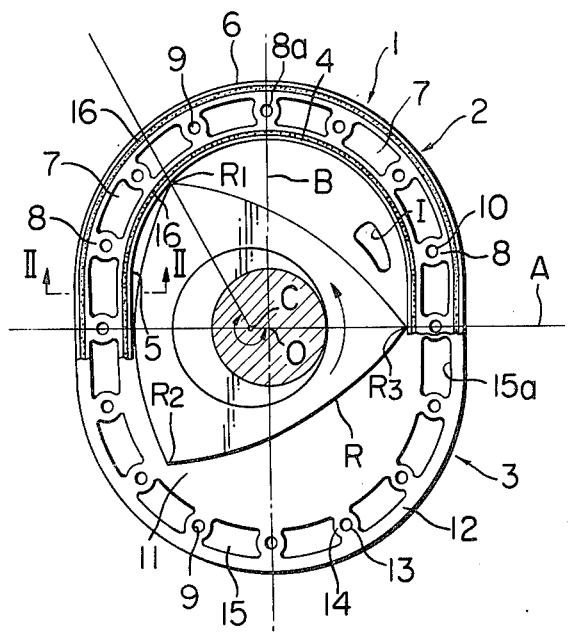
FIG. 1 is a partially cut away side view of a rotary piston engine to which the present invention can be applied.
Figure 2:
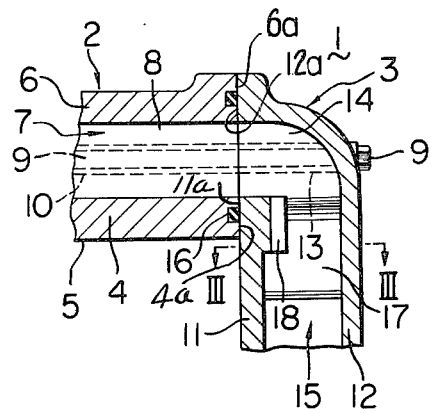
FIG. 2 is a fragmentary sectional view taken substantially along the line II—II in FIG. 1.

Referring now to the drawings, particularly to FIG. 1, the rotary piston engine shown therein includes a casing 1 which comprises a rotor housing 2 and a pair of side housings 3 secured to the opposite sides of the rotor housing 2. The rotor housing 2 includes an inner wall 4 having an inner wall surface 5 of trochoidal configuration having a minor axis A and a major axis B.

In the casing 1, there is a substantially triangular rotor R which is disposed for rotation about its center C and for revolution about the center O of the trochoid with apex portions R1, R2 and R3 in sliding contact with the inner wall surface 5 of the rotor housing 2. The side housing 3 is provided with an intake port I and the rotor housing 2 with an exhaust port (not shown).

The rotor housing 2 also has an outer wall 6 which is radially spaced from the inner wall 4 and connected therewith by a plurality of circumferentially spaced intermediate walls 8 to define a plurality of axially extending water jackets 7. As shown in FIG. 1, the intermediate wall 8 is sidewardly bulged and provided with an axially extending bolt hole 10.

The side housing 3 is comprised of an inner wall 11 having an inner surface 11a and an outer wall 12 having a surface 12a which is coplanar with the inner surface 11a of the inner wall 11. The surfaces 11a and 12a are respectively engaged with side surfaces 4a and 6a of the inner and outer walls 4 and 6 of the rotor housing 2. The outer wall 12 of the side housing is spaced from the inner wall 11 to define a water jacket 15. Between the inner and outer walls 11 and 12, there are formed a plurality of bosses 14 at positions corresponding to the intermediate walls 8 so that the water jacket 15 is provided with a plurality of openings 15a through which the water jacket 15 is communicated with the water jackets 7 in the rotor housing 2.

The bosses 14 are respectively aligned axially with the intermediate walls 8 in the rotor housing 2 and formed with bolt holes 13 which are axially aligned with the bolt holes 10 in the intermediate walls 8. The rotor and side housings 2 and 3 are thus secured together by means of a plurality of tightening bolts 9 extending through the aligned bolt holes 10 and 13. Between the side surfaces of the rotor housing 2 and the side housings 3, there are disposed seal rings 16 for the purpose of ensuring fluid tightness.

The boss 14 on the side housing 3 is further integrally formed with a rib 17 extending radially inwardly therefrom. Between two adjacent ribs 17 of the bosses 14, there is formed a rib 18 which is circumferantially extending along the peripheral portion of the inner wall 11 defining an edge of the opening 15a. As shown in FIGS. 3 and 4, the rib 18 has curved or concave top so that it has a height which smoothly decreases from the opposite ends toward the intermediate portion thereof. Such ribs 18 may not necessarily be provided throughout the peripheral length of the inner wall 11 of the side housing 2 but may be presented only in the "hot zone" of the engine. The term "hot zone" is used herein to mean such an area extending, as seen in the direction of rotation of the rotor R shown by an arrow in FIG. 1, from the position of the trailing apex portion in the working chamber at the compression dead center which is designated by R1 in FIG. 1 to the minor axis A of the trochoid at the side where the exhaust port (not shown) and the intake port I are provided.

As will be understood, the reinforcement ribs 18 serve to provide additional rigidity in the inner wall 11 of the side housing 3 particularly along the peripheral portion of the inner wall 11 or edges of the openings 15a of the jacket 15. This will be effective to provide a uniform contact pressure between the inner surface of the side housing 3 and the side surface of the rotor housing 2. Further, the inner wall 11 of the side housing 3 can well resist the pressure of the engine combustion gas so that the deformation can be minimized. As a result, it is possible to decrease remarkably the gas leakage through the interface between the side and rotor housings. In fact, it has been found that such leakage can be reduced to an amount less than one-half of that in conventional rotary piston engines. This will mean that the gas seal members 16 are well protected from contacting the engine combustion gas so that the overall life of the rotary piston engine can be increased. In the illustrated embodiment, the bosses 14 in the side housing 3 may not necessarily be formed with radial ribs such as shown by the reference 17. In such a case, the ribs 18 may be integrally connected with the cylindrical bodies of the bosses 14 and in some cases they may further be interconnected together.

Referring now to FIG. 5 which shows another embodiment of the present invention, the arrangements shown therein are essentially identical to those in the previous embodiment, so that corresponding parts are designated by the same reference numerals as in FIGS. 1 through 4. In this embodiment, each reinforcement rib 18 is formed with a fillet 19 along the side opposite to the opening 15a.

FIG. 6 shows an example in which the side housing 3 is provided with a rib 20 which connects the inner and outer walls 11 and 12 of the side housing at a position between each two adjacent ribs 17. Such additional rib 20 will give a further rigidity to the inner wall 11. Referring further to FIG. 7, the side housing 3 shown therein includes ribs 18, each having an intermediate portion 18a of constant height and end portions 18b with heights straightly increasing towards ends. In this design, it is preferable that the sum of the lengths $l_1$ and $l_2$ of the end portions is not less than one-half of the overall length $l$ of the rib 18. In the embodiment shown in FIG. 8, the reinforcement rib 18 has an intermediate portion 18a of curved or concave top and end portions 18b of constant heights. In this case, it is preferable that the length $l_3$ of the intermediate portion is greater than one-half of the overall length $l$ of the rib 18. FIG. 9 shows a further embodiment of the present invention in which the reinforcement rib 18 having a curved or concave top 18c is formed with fillets 19a and 19b at both sides.

The invention has thus been shown and described with reference to specific embodiments, however, it should be noted that the invention is in no way limited to the details of the illustrated arrangements but changes and modifications may be made without departing from the scope of the appended claims.

I claim:

1. Rotary piston engine including a casing which comprises a rotor housing having an inner wall of trochoidal configuration and opposite side surfaces and a pair of side housings each comprised of an inner wall having an inner surface and an outer wall having an end surface which is coplanar with the inner surface of the inner wall, said side housings being secured to the opposite side surfaces of the rotor housing with the inner surfaces of the inner walls and the end surfaces of the outer walls thereof in contact with the side surfaces of the rotor housing, a substantially polygonal rotor disposed in said casing with apex portions in sliding contact with the inner wall of the rotor housing, said rotor housing being formed with a plurality of axially extending water jackets which are separated from each other by a plurality of circumferentially spaced intermediate walls, each of said side housings being formed with means for defining a water jacket having a plurality of openings which are aligned with said water jackets in the rotor housing and separated by a plurality of bosses provided between said inner and outer walls of the side housing and adapted to be aligned with the intermediate walls in the rotor housing, said rotor and side housings being connected together by a plurality of tightening bolts extending through the aligned bosses and intermediate walls, said side housing being provided on said inner wall with reinforcing means including a reinforcement rib extending between each two adjacent bosses substantially along a peripheral portion of said inner wall of the side housing at a side opposite to the rotor housing for reinforcing the inner wall of the side housing against deflection under pressure of combustion gas.

2. Rotary piston engine in accordance with claim 1 in which said reinforcing means is provided only in the "hot zone" of the engine.

3. Rotary piston engine in accordance with claim 1 in which said rib has a curved top so that it has a height smoothly decreasing from the opposite ends to the intermediate portion thereof.

4. Rotary piston engine in accordance with claim 1 in which said rib has a fillet at a side of the rib opposite to said opening.

5. Rotary piston engine in accordance with claim 1 in which said rib has a fillets at both sides thereof.

6. Rotary piston engine in accordance with claim 1 in which said bosses are integrally formed with radially inwardly extending ribs and said reinforcement rib extends between two adjacent radially inward ribs.

7. Rotary piston engine in accordance with claim 1 in which each of said side housings has an outer wall which is spaced from the inner wall, each of said side housings being provided with a further rib connecting the inner and outer walls at a portion between each two adjacent bosses.

8. Rotary piston engine in accordance with claim 1 in which said rib has an intermediate portion of constant height and end portions having heights straightly increasing towards ends thereof.

9. Rotary piston engine in accordance with claim 8 in which the sum of the lengths of said end portions is not less than one-half of the overall length of the rib.

10. Rotary piston engine in accordance with claim 1 in which said rib has an intermediate portion having a curved top so that it has a height smoothly decreasing toward center and end portions of substantially constant heights.

11. Rotary piston engine in accordance with claim 10 in which said intermediate portion has a length which is not less than one-half of the overall length of the rib.

* * * * *